United States Patent
Chun et al.

(10) Patent No.: US 6,236,702 B1
(45) Date of Patent: *May 22, 2001

(54) FUEL ASSEMBLY SPACER GRID WITH SWIRL DEFLECTORS AND HYDRAULIC PRESSURE SPRINGS

(75) Inventors: Tae-Hyun Chun; Dong-Seok Oh; Wang-Kee In; Kee-Nam Song; Heung-Seok Kang; Kyung-Ho Yoon; Dae-Ho Kim; Je-Geon Bang; Youn-Ho Jung, all of Taejon-si (KR)

(73) Assignee: Korea Atomic Energy Research Institute, Taejon-si (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/121,930

(22) Filed: Jul. 24, 1998

(30) Foreign Application Priority Data

Apr. 2, 1998 (KR) ..................................................... 98-3133

(51) Int. Cl.[7] .................................................. G21C 3/34
(52) U.S. Cl. ........................... 376/462; 376/439; 376/442
(58) Field of Search .................................... 376/441, 442, 376/439, 462

(56) References Cited

U.S. PATENT DOCUMENTS

| | | | |
|---|---|---|---|
| 3,398,053 | * 8/1968 | Huber et al. | 376/442 |
| 3,762,996 | * 10/1973 | Milburn et al. | 376/442 |
| 3,847,736 | * 11/1974 | Bevilacqua | 376/439 |
| 3,933,584 | * 1/1976 | Litt | 376/442 |
| 3,944,467 | * 3/1976 | Biermann et al. | 376/442 |
| 4,007,899 | * 2/1977 | Piepers et al. | 376/442 |
| 4,010,796 | * 3/1977 | Scholtus | 376/442 |

(List continued on next page.)

FOREIGN PATENT DOCUMENTS

| | | | |
|---|---|---|---|
| 1439362 | * 4/1969 | (DE) | 376/442 |
| 1514558 | * 6/1969 | (DE) | 376/439 |
| 2157742 | * 5/1973 | (DE) | 376/439 |
| 0308701 | * 3/1989 | (EP) | 376/442 |
| 2221899 | * 9/1990 | (JP) | 376/442 |
| 6094873 | * 4/1994 | (JP) | 376/442 |
| 6230163 | * 8/1994 | (JP) | 376/442 |

Primary Examiner—Harvey E. Behrend
(74) Attorney, Agent, or Firm—Bachman & LaPointe, P.C.

(57) ABSTRACT

A fuel assembly spacer grid including swirl deflectors respectively arranged at interconnections between interconnecting longitudinally and laterally-extending straps on upper ends of the interconnecting straps adapted to support fuel elements of a nuclear fuel assembly. Each of the swirl deflectors has four vanes bent to have an air vane shape. By virtue of this configuration, an improvement in the efficiency of the spacer grid cooling the fuel elements. The spacer grid also includes springs each configured to generate not only a main spring force caused by a displacement of the spring occurring when the spring comes into contact with a fuel element placed in a reactor core, but also an additional spring force caused by hydraulic pressure applied to the spring. Each spring, which is in a fixed state at one end thereof, has a free bent portion at the other end. By virtue of such a spring configuration, it is possible to compensate for a reduction in the initial spring force of the spring resulting from a change in the property of the spring material. The spring has a curved contact portion configured in such a manner that it is in conformal surface contact with a circumferential surface of the fuel element, thereby enhancing vibration suppressing and abrasion resistance forces.

5 Claims, 8 Drawing Sheets

U.S. PATENT DOCUMENTS

| | | | |
|---|---|---|---|
| 4,726,926 | | 2/1988 | Petterson et al. ............... 376/839 |
| 4,803,043 | * | 2/1989 | DeMario et al. ............... 376/442 |
| 4,844,861 | * | 7/1989 | Leclerq ............... 376/439 |
| 4,879,090 | * | 11/1989 | Perrotti et al. ............... 376/439 |
| 4,951,299 | * | 8/1990 | Patterson et al. ............... 376/442 |
| 4,957,697 | * | 9/1990 | Wada ............... 376/442 |
| 5,243,635 | | 9/1993 | Bryan ............... 376/442 |
| 5,247,551 | * | 9/1993 | Swam ............... 376/441 |
| 5,272,741 | * | 12/1993 | Masuhara et al. ............... 376/439 |
| 5,402,457 | * | 3/1995 | Suchy et al. ............... 376/439 |
| 5,440,599 | * | 8/1995 | Rodack et al. ............... 376/441 |
| 5,793,832 | * | 8/1998 | Lettau ............... 376/442 |
| 5,862,196 | * | 1/1999 | Wolfrom ............... 326/439 |

* cited by examiner

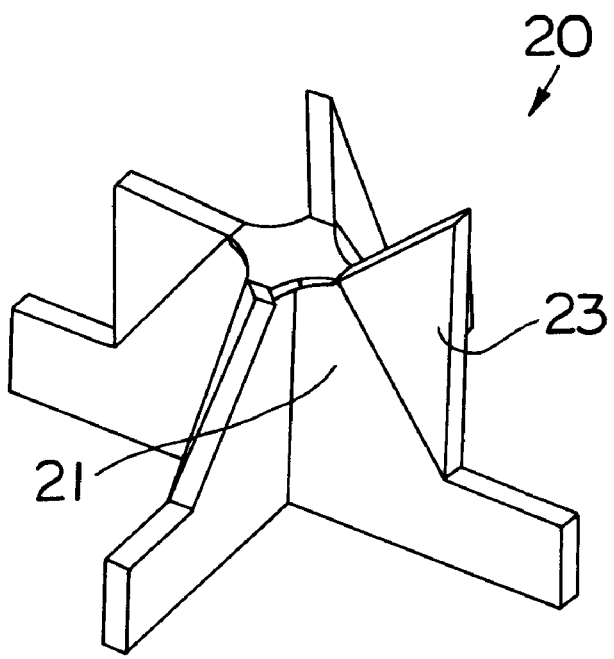
F I G. 5
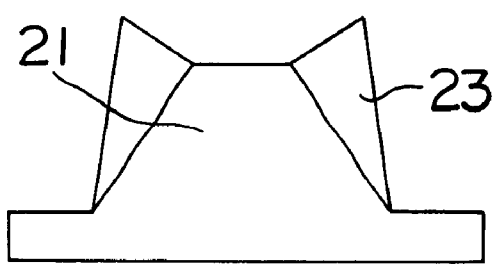
F I G. 6

FUEL ASSEMBLY SPACER GRID WITH SWIRL DEFLECTORS AND HYDRAULIC PRESSURE SPRINGS

BACKGROUND OF THE INVENTION

1. Field of the Invention

The present invention relates to a fuel assembly spacer grid for nuclear reactors, and more particularly to a fuel assembly spacer grid used for a nuclear fuel assembly placed in a reactor core at a nuclear power plant, which spacer grid is provided with swirl deflectors, hydraulic pressure springs, and wear resistant springs.

2. Description of the Prior Art

Referring to FIG. 1, a nuclear reactor is illustrated in which a nuclear fuel assembly is placed in a reactor core denoted by the reference numeral 101. Typically, a spacer grid 103 is used to firmly support fuel elements 111 of the nuclear fuel assembly in a state placed in the reactor core. Such a spacer grid 103 consists of a plurality of longitudinally-extending parallel vertical straps and a plurality of laterally-extending parallel vertical straps perpendicularly interconnecting the longitudinally-extending straps. The fuel elements 111 are placed in internal spaces defined by the interconnecting straps, respectively. The spacer grid 103 serves to prevent the nuclear fuel from being damaged due to vibrations of the fuel elements 111 caused by a flow of cooling water in the reactor core. The spacer grid 103 also maintains a desired space between each fuel element 111 and a guide tube 102 arranged adjacent to the fuel element 111 even when the nuclear reactor is subjected to an earthquake or other external impact. In other words, the spacer grid 103 always provides a flow passage for the cooling water, thereby keeping a desired cooling function for the reactor core. In this regard, active research efforts have been made to provide a spacer grid capable of suppressing vibrations and abrasion of fuel elements while enhancing a resistance to lateral impact.

In order to support the fuel elements 111, the spacer grid 103 has a plurality of protrusions which are typically formed by forming slots at desired portions of the straps, and depressing portions of the straps each positioned between adjacent slots. Of the protrusions, those, which have a low strength, thereby supporting fuel elements while being depressed by those fuel elements, are called "springs". On the other hand, protrusions, which have a high strength, thereby supporting fuel elements while exhibiting little or no deformation, are called "dimples". When springs are subjected to irradiation of neutrons for an extended period of time, they change the property of their material. As a result, the springs exhibit a gradual reduction in elasticity. This results in a reduction in the support force of the springs for the fuel elements, thereby causing those elements to vibrate. Due to such vibrations, the fuel elements may be subjected to a fretting wear at portions contacting the fuel element-supporting elements of the straps. Such a fretting wear of the fuel elements results in a perforation of the fuel elements which, in turn, causes a leakage of radioactivity. In connection with this, several reports have been made.

It is known that an important geometric factor causing the above mentioned fretting wear of fuel elements is the shape of contacts between elements being in contact with each other. In conventional configurations, the contacts between fuel elements and springs or between fuel elements and dimples have a point or line contact shape. In terms of fretting wear, the line contact shape provides a high ability of suppressing vibrations and a high abrasion resistance, as compared to the point contact shape. This is because an increase in contact area at a constant elasticity of springs results in a reduction in the contact pressure causing a depression of those springs, thereby suppressing a fretting wear of fuel elements contacting the springs.

In the case of springs in which elasticity depends only on a material used, as in the above mentioned springs, a reduction in elasticity occurs inevitably due to an irradiation of neutrons onto the springs. In order to eliminate such a drawback, it is necessary to increase the initial spring force of springs. Alternatively, an additional force capable of compensating for the reduced mechanical property of springs should be applied to those springs. However, an increase in the initial spring force may result in an increase in the force required upon initially placing a nuclear fuel assembly, thereby causing a damage of fuel elements.

On the other hand, fuel elements placed in a reactor core exhibit a non-uniform heat flux distribution. Due to such a non-uniform heat flux distribution, a severe increase in the temperature of a cooling water in the reactor core occurs at areas surrounding fuel elements generating a higher heat flux, namely, exhibiting a higher temperature. Meanwhile, bubbles may be locally formed on the surfaces of fuel elements. Where the formation of such bubbles may become severe, thereby covering the surfaces of fuel elements, an abrupt degradation in heat transfer efficiency occurs. This results in an abrupt increase in temperature on the surface of fuel elements. In this case, the temperature of fuel elements themselves or pallets present in the fuel elements may reach a melting point of the fuel elements or pallets. To this end, spacer grids also have a function for forcibly mixing flows of cooling water flowing along areas surrounding fuel elements, thereby obtaining a uniform temperature of the fuel elements while achieving an improvement in the heat transfer performance at the surfaces of the fuel elements. Such a function of spacer grids assists a safe operation of nuclear reactors. For such a function, spacer grids, which include elements for supporting fuel elements, may be attached with separate flow mixing devices adapted to enhance the heat transfer performance.

A typical one of conventional flow mixing methods is a method in which cooling water forms a strong wake when it passes through a spacer grid, thereby mixing flows of the cooling water to promote a temperature uniformity. In such a method, however, the flow mixing function is greatly attenuated as the cooling water flows downstream away from the spacer grid.

Another conventional flow mixing method is a forced swirling method. In accordance with this method, cooling water is swirled in such a manner that cooling water flows of a high density are forced to flow toward the surfaces of fuel elements with bubbles of a low density being concentrated toward the center of swirling. In this case, the layer of the bubbles serves to prevent a reduction in the heat transfer performance, thereby achieving an improvement in the cooling performance of fuel elements. It is known that the forced swirling method exhibits a slow attenuation in flow mixing effect generated when cooling water passes through the spacer grid, as compared to the wake forming method. Recent developments of spacer grids are focused on the formation of swirling flows.

The loss of pressure in a cooling water flow generated when the cooling water passes an obstacle depends mainly upon an area projected onto a plane normal to the flow direction of the cooling water. The provision of a flow mixer results in an additional pressure loss because an increase in the projected area causes a reduction in the area through which the cooling water flows.

Such an increase in pressure loss results in an increase in the load applied to a pump for pumping the cooling water. For this reason, there is a problem in that the flow rate of the cooling water flowing in the nuclear reactor decreases. Therefore, where a flow mixer is attached to the spacer grid, a design capable of minimizing the loss of pressure at the same projected area should be provided.

Recent developments of nuclear fuel are concentrated on a highly burn-up and non-defective fuel. In the case of a highly-combustible fuel, an increase in the nuclear fuel concentration may be involved. In this case, a severe heat flux peaking phenomenon may occur. Here, the output peaking phenomenon is a phenomenon wherein a part of fuel elements generate a heat flux considerably higher than the mean heat flux of those fuel elements. Where such a severe heat flux peaking phenomenon occurs, a severe boiling phenomenon occurs on the surfaces of fuel elements. This results in a high possibility of a great degradation in heat transfer rate. To this end, it is required to develop a spacer grid with a superior cooling performance over conventional spacer grids. Due to a high burn-up capacity, the using period of the nuclear fuel is extended. In this case, the amount of neutrons irradiated onto the spacer grid increases. This is an important consideration in that the problem associated with a decrease in spring force may occur due to a change in the property of the spacer grid material. For the development of a non-defective fuel, therefore, it is necessary, in terms of fretting wear, to provide a mechanism capable of compensating for a decrease in the spring force required for suppressing vibrations of fuel elements.

SUMMARY OF THE INVENTION

Therefore, an object of the invention is to solve the above mentioned problems involved in conventional fuel assembly spacer grids, and to provide a fuel assembly spacer grid provided with swirl deflectors each capable of generating a strong swirling flow of cooling water while maintaining the swirling motion far downstream of the cooling water flow.

Another object of the invention is to provide a fuel assembly spacer grid provided with swirl deflectors each capable of generating a strong swirling flow of cooling water while using a small bent angle at which the swirl deflector comes into contact with the cooling water, thereby minimizing the loss of pressure in the cooling water flow caused by the provision of the swirl deflector.

Another object of the invention is to provide a fuel assembly spacer grid capable of utilizing the hydraulic drag force on spring in a cooling water flow passing through the spacer grid as an additional spring force, thereby compensating for a decrease in the initial mechanical spring force caused by a change in the property of the material of the spacer grid occurring in a reactor core where the spacer grid is disposed.

Another object of the invention is to provide a fuel assembly spacer grid in which the portions of the springs and dimples thereof contacting fuel elements have a conformal surface contact shape in such a manner that those contact portions are in surface contact with the fuel elements, thereby effectively suppressing vibrations of the fuel elements and greatly reducing the possibility of a fretting abrasion of the fuel elements resulting in a damage of the fuel elements.

In accordance with the present invention, these objects are accomplished by providing a fuel assembly spacer grid for a nuclear reactor comprising a plurality of longitudinally-extending, parallel, spaced vertical straps, and a plurality of laterally-extending, parallel, spaced vertical straps perpendicularly interconnecting the longitudinally-extending straps, the interconnecting straps supporting fuel elements of a nuclear fuel assembly, further comprising: a plurality of swirl deflectors respectively arranged at interconnections between the interconnecting straps on upper ends of the interconnecting straps and adapted to generate a swirling flow from a cooling water passing through the spacer grid, each of the swirl deflectors having a plurality of vanes bent to have an air vane shape.

BRIEF DESCRIPTION OF THE DRAWINGS

Other objects and aspects of the invention will become apparent from the following description of embodiments with reference to the accompanying drawings in which:

FIG. 5 is a perspective view illustrating a swirl deflector shown in FIG. 3 or 4;

FIG. 6 is an elevational view illustrating the shape of vanes, in the case of the swirl deflector of FIG. 5, given before the vanes are bent;

DESCRIPTION OF THE PREFERRED EMBODIMENTS

Figure 1:
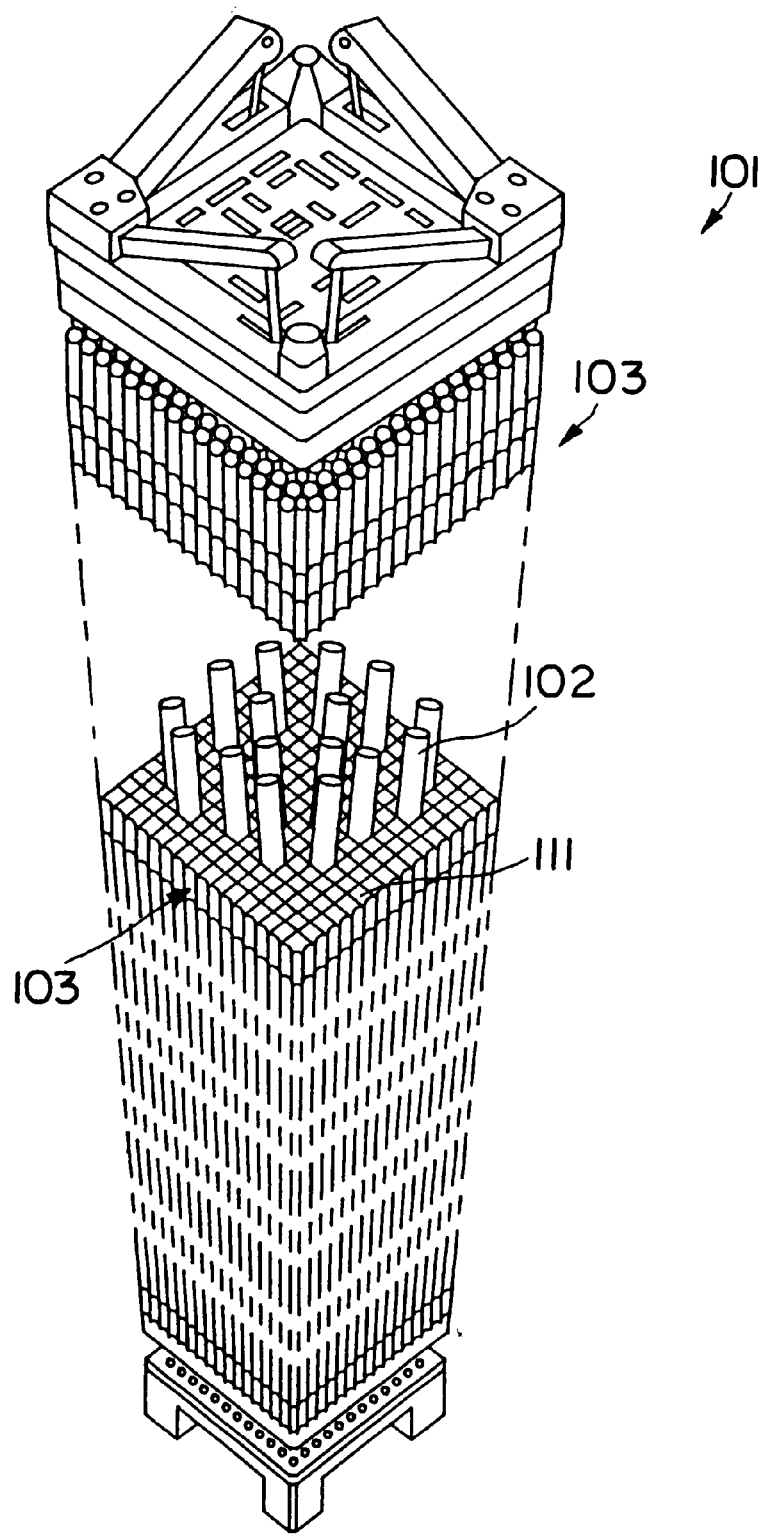
FIG. 1 is a schematic perspective illustrating a typical fuel assembly.
Figure 2:
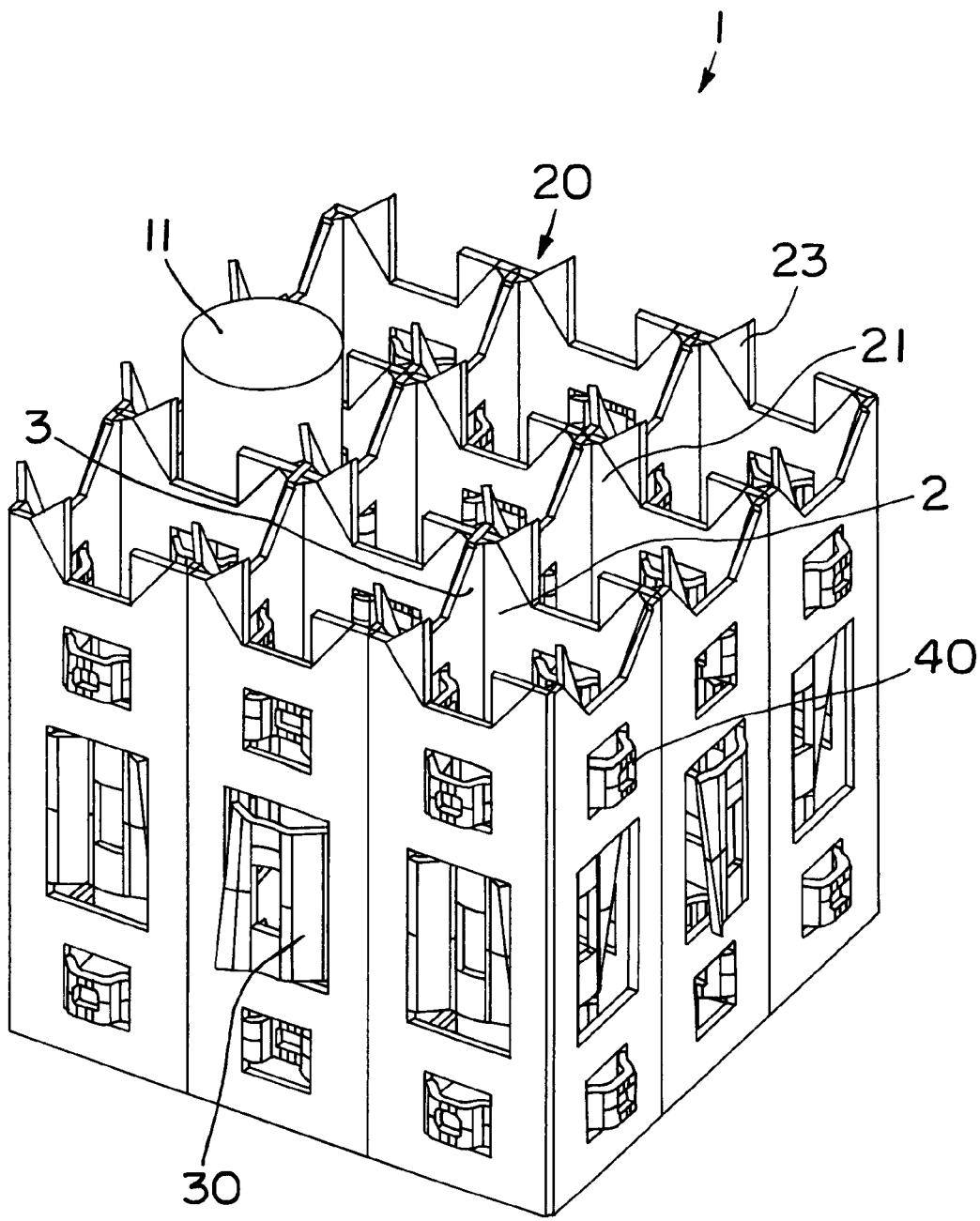
FIG. 2 is a perspective view illustrating a fuel assembly spacer grid according to an embodiment of the present invention.
Figure 3:
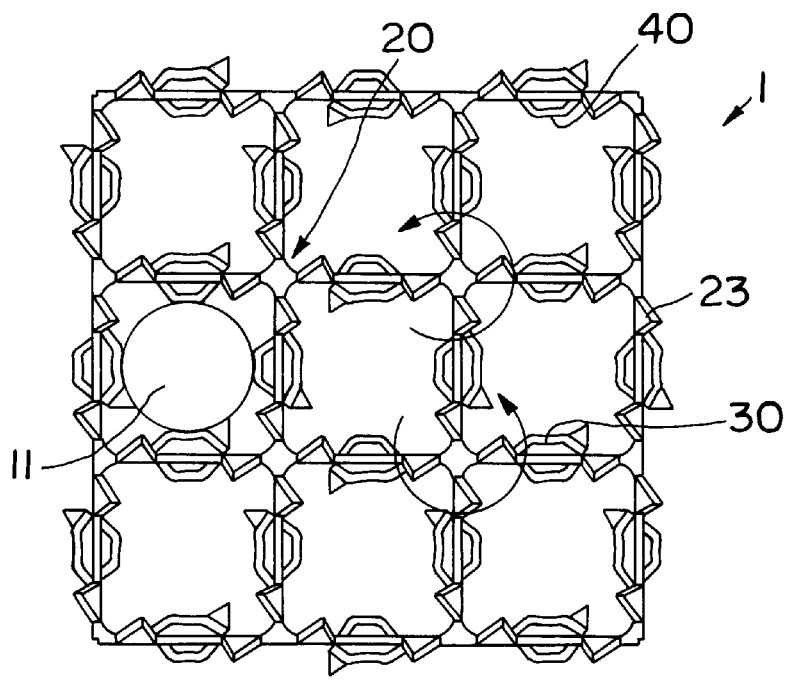
FIG. 3 is a plan view of the spacer grid shown in FIG. 2.
Figure 4:
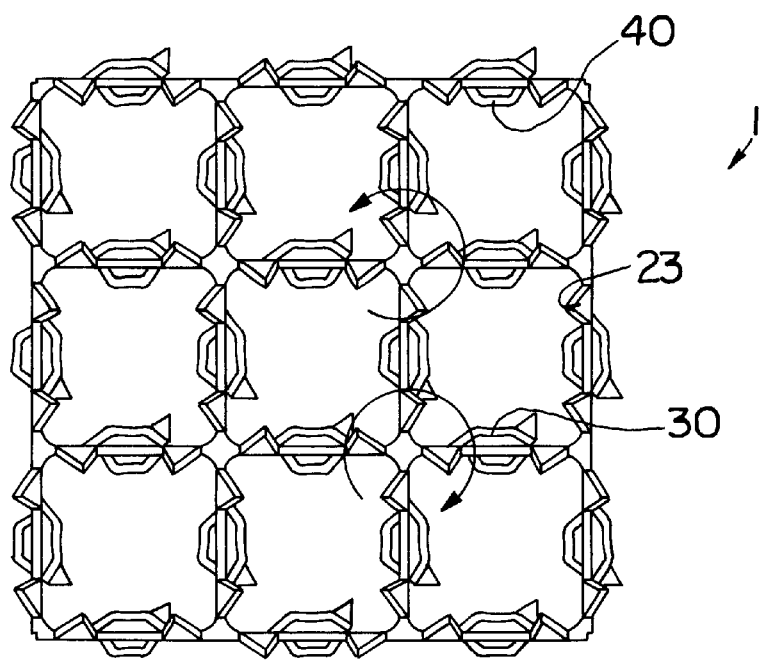
FIG. 4 is a plan view of a fuel assembly spacer grid according to another embodiment of the present invention in which it generates a swirling flow in a direction reverse to that in the embodiment of FIG. 3.

Referring to FIG. 2, a fuel assembly spacer grid according to an embodiment of the present invention is illustrated. As shown in FIG. 2, the spacer grid, which is denoted by the reference numeral 1, includes a plurality of longitudinally-extending, parallel, spaced vertical straps 2 and a plurality of laterally-extending, parallel, spaced vertical straps 3 perpendicularly interconnecting the longitudinally-extending straps 2, in order to support fuel elements of a nuclear fuel assembly. The spacer grid 1 also includes a plurality of swirl deflectors 20 respectively provided at the upper ends of the interconnections between the straps 2 and 3, a plurality of springs 30 provided at the straps 2 and 3, and a plurality of dimples 40 provided at the straps 2 and 3. As shown in FIG. 3 viewing the spacer grid 1 from above, the springs 30 and dimples 40 have conformal contact portions having the same radius of curvature as fuel elements 11 to be supported by the spacer grid 1. The swirl deflectors 20 have an air vane structure including vanes 23. As shown in FIGS. 2 and 3, the swirl deflectors 20 are configured to have the same vane rotation direction. If desired in terms of an improvement in cooling performance, however, the swirl deflectors 20 may be configured to have reverse vane rotation directions at adjacent cooling water passages, respectively, as shown in FIG. 4.

A detailed structure of the swirl deflectors 20 is shown in FIG. 5. As shown in FIG. 5, each swirl deflector 20 has a pair of intersecting triangular base plates 21 extending upwardly from the interconnecting straps 2 and 3 at the interconnection thereof, respectively, and four vanes 23 extending upwardly from respective side surfaces of the base plates 21. In order to generate a swirling flow, the vanes 23 of each swirl deflector 20 are bent in the same direction from the associated base plates 21, respectively. The bent angle of each vane 23 should not excess 90°. Each swirl deflector 20 may be fixed to the straps 2 and 3 by means of welding. In order to obtain a desired strength of the spacer grid 1, the vanes 23 may have a controlled size. Although each swirl deflector 20 has four vanes 23 in the illustrated case, it may have only two vanes attached to a selected one of the straps 2 and 3. Where it is desired to increase the vane area, each vane 23 may be enlarged in such a manner that it has a larger width at the upper portion thereof than that at the lower portion thereof. FIG. 6 shows the shape of the vanes 23 given before the vanes 23 are bent. As shown in FIG. 6, each base plate 21 protrudes upwardly from the upper end of the associated strap 2 or 3. Vanes 23 are disposed on opposite sides of the base plate 21, respectively.

Figure 7:
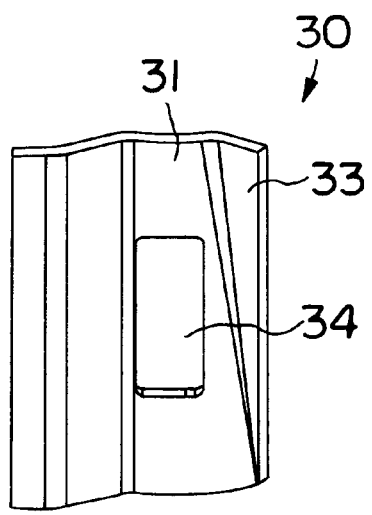
FIG. 7 is a perspective view illustrating a spring shown in FIG. 2.
Figure 8:
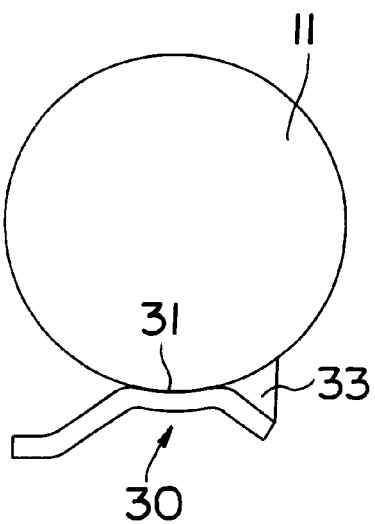
FIG. 8 is a plan view illustrating the spring of FIG. 7 which supports a fuel element.

FIGS. 7 and 8 illustrate a detailed structure of the springs 30. Each spring 30 protrudes from the associated strap 2 or 3. That is, the spring 30 is attached at one end thereof to the associated strap 2 or 3 and has an elastic free end at the other end thereof. The spring 30 also has a contact portion 31 contacting a fuel element 11. The contact portion 31 is configured to come into surface contact with the circumferential surface of the fuel element 11. In order to adjust the spring force, the spring 30 also has an opening 34. Although the opening 34 has a rectangular shape in the illustrated case, it may have a variety of shapes for desired spring characteristics. The free end of the spring 30 is inclinedly bent, thereby forming a bent end portion 33 having a shape inclined with respect to the axis of the fuel element 11 in such a manner that it has a width increasing gradually as it extends upwardly. The bent end portion 33 of the spring 30 is subjected to a hydraulic drag force when the spring 30 is positioned in a flow of cooling water. Thus, the spring 30 serves as a hydraulic pressure spring. The hydraulic pressure spring 30 varies its spring force in accordance with a variation in the flow rate of cooling water. As the flow rate of cooling water increases, the hydraulic pressure spring 30 increases in spring force, so that it supports the fuel element more firmly.

Figure 9:
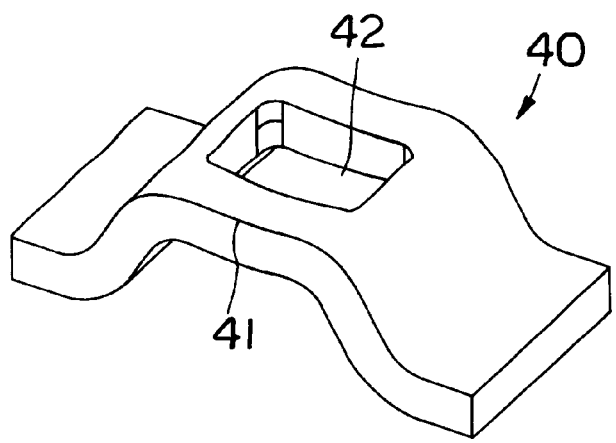
FIG. 9 is a perspective view illustrating a dimple shown in FIG. 2.

FIG. 9 illustrates a detailed structure of the dimples 40 which serve to support fuel elements 11 at positions opposite to the springs 30. Each dimple 40 protrudes from the associated strap 2 or 3. The dimple 40 has a contact portion 41 contacting a fuel element 11. The contact portion 41 has the same radius of curvature as the fuel element 11 so that the dimple 40 has an increased contact area. By virtue of such an increased contact area, it is possible to reduce abrasion of the fuel element. The dimple 40 also has an opening 42 so as to have an increased height and a reduced strength.

Figure 10:
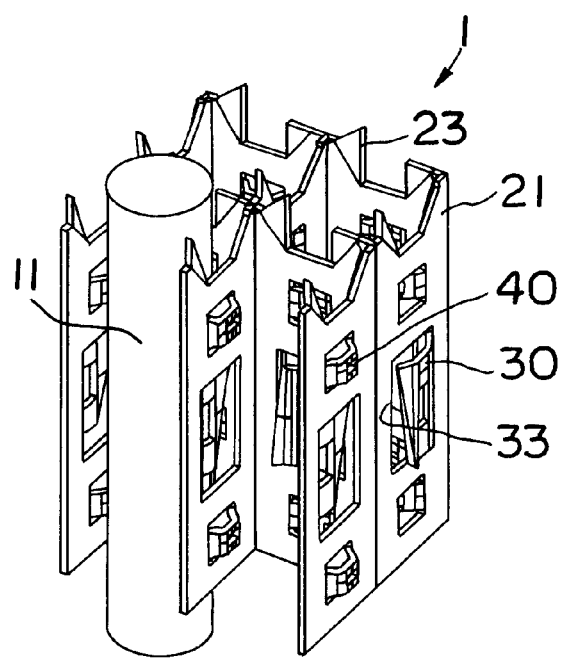
FIG. 10 is a partially-broken perspective view showing the interior of the spacer grid shown in FIG. 4.
Figure 11:
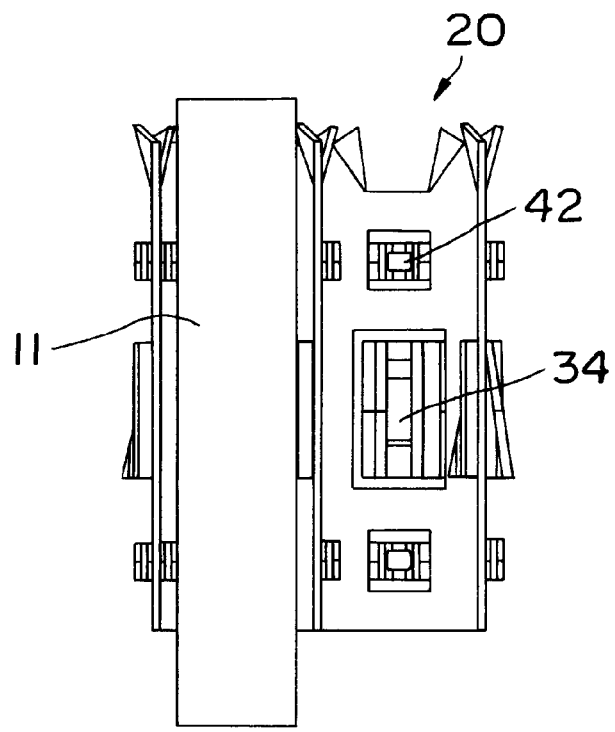
FIG. 11 is a sectional view of FIG. 10.

FIG. 10 is a partially-broken perspective view showing the interior of the spacer grid 1 shown in FIG. 2 whereas FIG. 11 is a sectional view of FIG. 10. These drawings show the contact relationship between the springs 30 and the fuel element 11 supported by the springs 30, and a method for supporting the fuel element 11. As shown in FIGS. 10 and 11, one spring 30, which is formed on each strap, is positioned at the middle portion (when viewed in a vertical direction) of the strap. Two dimples 40 are positioned above and beneath the spring 30. Accordingly, each fuel element is supported at six points by the surrounding fuel straps.

Figure 12:
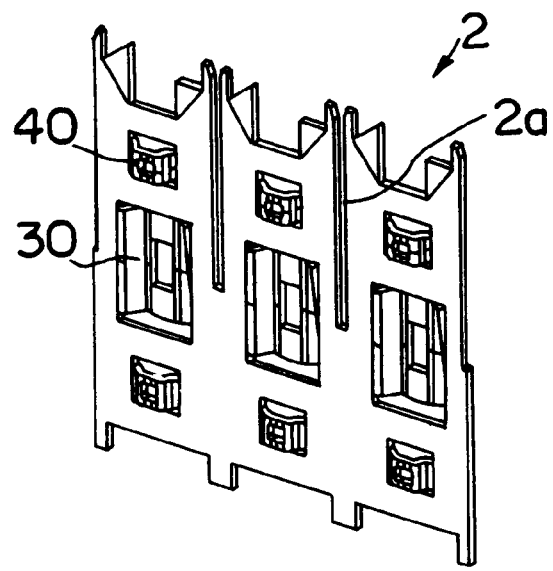
FIG. 12 is a perspective view illustrating a longitudinally-extending strap included in the spacer grid of FIG. 4.

FIG. 12 is a perspective view illustrating one of the longitudinally-extending straps 2 included in the spacer grid 1 of FIG. 2. The longitudinally-extending strap 2 is provided at the upper end thereof with a plurality of uniformly-spaced coupling grooves 2a so that it is interconnected with the laterally-extending straps 3 in a cross fashion.

Figure 13:
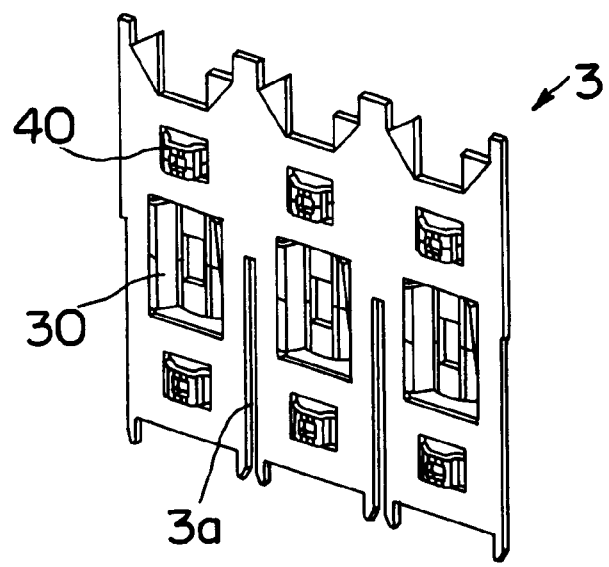
FIG. 13 is a perspective view illustrating a laterally-extending strap included in the spacer grid of FIG. 4.

FIG. 13 is a perspective view illustrating one of the laterally-extending straps 3 included in the spacer grid 1 of FIG. 2. The laterally-extending strap 3 is provided at the upper end thereof with a plurality of uniformly-spaced coupling grooves 3a so that it is interconnected with the longitudinally-extending straps 2 in a cross fashion.

Figure 14:
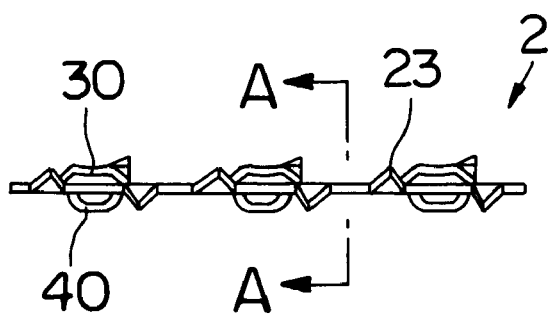
FIG. 14 is a plan view of FIG. 12.

FIG. 14 is a plan view illustrating the longitudinally-extending strap 2 shown in FIG. 12. As shown in FIG. 14, the vanes 23 of neighboring swirl deflectors are bent in the same direction. The spring 30 and dimples 40, which are provided at each strap, are arranged on the swirl deflector along the same vertical axis. The spring 30 and dimples 40 protrude from the strap in opposite directions in order to support fuel elements disposed at opposite sides of the strap, respectively.

Figure 15:
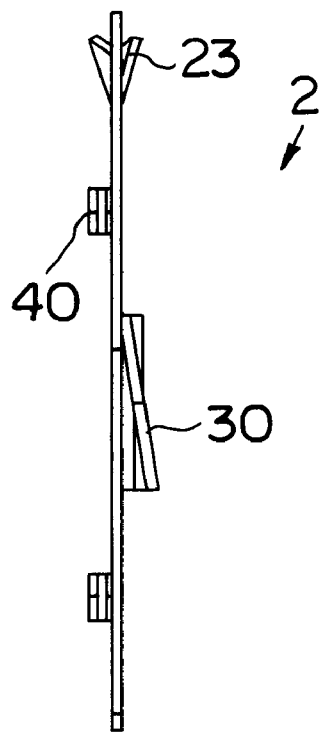
FIG. 15 is a cross-sectional view taken along the line A—A of FIG. 14.

FIG. 15 is a cross-sectional view taken along the line A—A of FIG. 14. As shown in FIG. 15, the vanes 23 of each swirl deflector are bent from the base plate 21 of the swirl deflector by a desired angle in order to increase an effect of mixing flows of cooling water while minimizing an interference thereof with the associated fuel element 11. FIG. 15 also shows that each hydraulic pressure spring 30 is bent at its free end by a desired angle with respect to the vertical axis of the associated strap, so that it generates a horizontal pressure when it comes into contact with a flow of cooling water, thereby increasing the spring force supporting the associated fuel element 11.

As apparent from the above description, the swirl deflector 20 provided at the spacer grid 1 according to the present invention can produce a strong swirling flow of cooling water, as compared to conventional devices. This is because the swirl deflector 20 includes four vanes 23 formed into an air vane shape at each interconnection between the straps 2 and 3. Where the vanes 23 of the swirl deflector 20 have a streamline shape, it is possible to produce a more efficient swirling flow of cooling water while achieving a reduction in pressure loss.

For the production of a strong swirling flow of cooling water, four vanes having the above mentioned structure are provided at both the longitudinally and laterally-extending straps 2 and 3 at each interconnection, respectively. On the other hand, two vanes are provided at a selected one of the straps 2 and 3 at each interconnection for a reduction in the pressure loss caused by the provision of the swirl deflector 20.

Since the vanes 23 of each swirl deflector 20 are formed in such a fashion that they are bent from the opposite side surfaces of the associated base plate 21, they swirl a flow of cooling water flowing upwardly from beneath, thereby efficiently guiding the cooling water flow. Accordingly, a reduced pressure loss occurs, as compared to conventional devices.

Since each spring 30 is attached at one end thereof to the associated strap 2 or 3 while being provided at the other end thereof with an inclinedly-bent elastic free end, it is subjected to hydraulic pressure when it is positioned in a flow of cooling water. Accordingly, the spring 30 generates not only a mechanical spring force, but also an additional spring force resulting from the hydraulic pressure applied thereto. Thus, it is possible to compensate for a reduction in the initial spring force of the spring.

In conventional devices, a flow of cooling water, which is introduced in the spacer grid through a central portion of the spacer grid, strikes a swirling flow of cooling water passing through the spacer grid, thereby offsetting the swirling effect of the swirling flow. In accordance with the present invention, however, the swirl deflector 20 has four integral vanes arranged on quadrant regions defined by the longitudinally and laterally-extending straps. Accordingly, a flow of cooling water, which is introduced in the spacer grid through a central portion of the spacer grid, is forced to be swirled when it passes through the swirl deflector 20 disposed at the downstream of the spacer grid. Thus, the swirling motion of the cooling water flow can be maintained far the downstream of the spacer grid. In accordance with the present invention, the swirling vanes 23 of each swirl deflector 20 are attached to opposite side surfaces of the triangular base plate 21 in such a manner that they extend inclinedly. Accordingly, it is possible to provide a larger vane area at the same projected area, as compared to the vanes of conventional devices. By virtue of such an increased vane area, there is an advantage in terms of the generation of a swirling flow of cooling water.

By virtue of the generation of a strong swirling flow of cooling water and a delayed disappearance of the swirling flow, a centrifugal force generated in the cooling water flow causes bubbles of a lower density produced from the cooling water flow on the surfaces of fuel elements 11 to be concentrated on the swirling center of the cooling water flow while causing the liquid portion of the cooling water flow, which has a higher density, to move toward the surfaces of the fuel elements 11. Accordingly, an improvement in the cooling performance of the spacer grid 1 is achieved. In accordance with such an improvement in cooling performance, the spacer grid 1 ultimately suppresses a boiling phenomenon occurring in fuel elements, thereby preventing a leakage of radioactive materials from the fuel elements. This contributes to the safety of the nuclear reactor.

Since the vanes 23 of each swirl deflector are attached to the triangular base plate 21 in accordance with the present invention, they have an elongated and inclined base. Accordingly, these vanes 23 are more stable structurally and mechanically, as compared to conventional vanes attached to a base plate having a shape other than the triangular shape. Therefore, it is possible to prevent the vanes from being easily deformed or broken due to an external impact applied thereto during a placement of a fuel assembly in the reactor core or during a transportation of the spacer grid.

As apparent from the above description, the present invention provides a fuel assembly spacer grid including springs each configured to generate not only a main spring force caused by a displacement of the spring occurring when the spring comes into contact with a fuel element placed in a reactor core, but also an additional spring force caused by hydraulic pressure applied to the spring. Each spring, which is in a fixed state at one end thereof, has a free bent portion at the other end. When a flow of cooling water flowing upwardly from beneath strikes the bent portion of the spring, it reflects inclinedly from the bent portion of the spring while applying hydraulic pressure to the spring. As a result, the spring applies the pressure to the fuel element supported thereby. That is, the hydraulic pressure of the cooling water flow applied to the spring serves as an additional spring force. Thus, it is possible to compensate for a reduction in the initial spring force of the spring resulting from a change in the property of the spring material.

The hydraulic pressure on the spring in the cooling water flow varies in accordance with a variation in the flow rate of the cooling water flow in such a fashion that it increases at a higher flow rate while decreasing at a lower flow rate. Accordingly, there is an advantage in that the spring force adapted to support fuel elements can be adjusted by controlling the flow rate of the cooling water flow. The spring force resulting from the cooling water flow is always generated at a substantially constant level unless the shape of the spring is changed. In an environment where the initial spring force of the spring is gradually reduced due to a repeated irradiation of neutrons, as in the interior of a nuclear reactor, it is possible to sufficiently compensate for the reduced portion of the spring force. Accordingly, the utility of the spring according to the present invention increases, in particular, in the case in which a fuel assembly is placed in a reactor core for an extended period of time.

In accordance with the present invention, the spring has a conformal contact portion contacting the circumferential surface of a fuel element, supported thereby, in a larger area. By virtue of such an increased contact area, the spring exhibits a high resistance to a fretting abrasion of the fuel element caused by vibrations and resulting in a damage of the fuel element. In order to solve problems resulting from an excessive increase in the spring force caused by the increased contact area, the spring also has an opening at the conformal contact portion. Accordingly, it is possible to maintain a desired height of the contact between the spring and fuel element without reducing the height of the spring itself. Therefore, the insertion and withdrawal of fuel elements can be achieved without requiring an excessive force. This reduces the possibility of a damage of fuel elements. That is, there is no possibility of a corrosion of fuel elements occurring at damaged areas. Accordingly, it is possible to prevent the life of fuel elements from being reduced.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A fuel assembly spacer grid for a nuclear reactor comprising a plurality of longitudinally-extending, parallel, spaced vertical straps, and a plurality of laterally-extending, parallel, spaced vertical straps perpendicularly interconnecting the longitudinally-extending straps, the interconnecting straps supporting at least one fuel element of a nuclear fuel assembly, further comprising:
  a plurality of interior interconnections each formed about an axis at the interconnections of the interconnecting straps and the interconnections having an upper end;
  a plurality of swirl deflectors each respectively arranged at an interior interconnection on the upper end of the interconnections, the swirl deflector comprises a pair of interconnecting substantially triangular base plates extending upwardly from a respective strap, each triangular base plate comprises a base on the strap and a side surface extending upwardly at an obtuse angle from the base on each of the respective strap toward the axis and a pair of vanes attached to each side surface of each substantially triangular base plate wherein the vanes are bent at an angle to the base plate to have an air vane shape; and a spring in a fixed state at one end thereof while being in a free state at the other end thereof, the spring having a curved contact portion arranged between the ends thereof, the curved contact portion being in surface contact with a circumferential surface of a fuel element supported thereby, and the spring being configured to utilize, as a spring force, a hydraulic drag force generated when a cooling water flow passing through the spacer grid comes into contact with a bent portion at the free end of the spring, the bent portion being inclinedly bent with respect to a flowing direction of the cooling water flow in such a manner that it has a larger area at an upper portion thereof than that at a lower portion thereof wherein the spring force of the spring varies with the cooling water flow such that an increase in cooling water flow rate increases the spring force so as to support the fuel element more firmly.

2. The fuel assembly spacer grid according to claim 1, wherein each of the vanes included in each of the swirl deflectors has, at an upper portion thereof, a width determined in accordance with a desired swirling diameter of the swirling flow.

3. The fuel assembly spacer grid according to claim 1, wherein the vanes of neighboring ones of the swirl deflectors are bent in such a manner that they have one of the same rotational direction and opposite rotational directions.

4. The fuel assembly spacer grid according to claim 1, wherein each of the springs has an opening adapted to adjust the spring strength of the spring while maintaining a contact height of the spring required to suppress vibrations of the fuel element supported by the spring.

5. The fuel assembly spacer grid according to claim 4, wherein the opening of the spring has a shape determined in accordance with characteristics of the spring.

* * * * *

UNITED STATES PATENT AND TRADEMARK OFFICE
CERTIFICATE OF CORRECTION

PATENT NO.     : 6,236,702 B1
DATED          : May 22, 2001
INVENTOR(S)    : Tae-Hyun Chun et al.

It is certified that error appears in the above-identified patent and that said Letters Patent is hereby corrected as shown below:

<u>Title page,</u>
Item [73], second assignee is added as follows:
-- Korea Electric Power Corporation, Seoul, Republic of Korea --

Signed and Sealed this

Fourth Day of February, 2003

JAMES E. ROGAN
*Director of the United States Patent and Trademark Office*